(12) United States Patent
Yanagisawa (10) Patent No.: US 6,252,737 B1
(45) Date of Patent: Jun. 26, 2001

(54) CONTACT MAGNETIC DISK APPARATUS (75) Inventor: Masahiro Yanagisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/199,441

(22) Filed: Nov. 25, 1998

(30) Foreign Application Priority Data

Nov. 27, 1997 (JP) .................................... 9-326451

(51) Int. Cl.$^7$ .................................................. G11B 5/596
(52) U.S. Cl. ...................... 360/78.06; 360/75; 360/246.1
(58) Field of Search ............................. 360/234.1, 246.1, 360/246.2, 75, 78.06, 69, 73.01, 73.03

(56) References Cited

U.S. PATENT DOCUMENTS

| | | | |
|---|---|---|---|
| 5,309,301 | * | 5/1994 | Gregory et al. ...................... 360/137 |
| 5,541,789 | * | 7/1996 | Fukuoka et al. ................... 360/234.1 |
| 5,850,321 | * | 12/1998 | McNeil et al. ........................ 360/106 |
| 5,889,635 | * | 3/1999 | Sato ................................... 360/234.1 |

FOREIGN PATENT DOCUMENTS

| | | |
|---|---|---|
| 7-211045 | 8/1995 | (JP) . |
| 8-83421 | 3/1996 | (JP) . |

\* cited by examiner

Primary Examiner—Andrew L. Sniezek
Assistant Examiner—Kin Wong
(74) Attorney, Agent, or Firm—McGinn & Gibb, PLLC

(57) ABSTRACT

A contact magnetic disk apparatus includes a magnetic disk, a magnetic head, a contact pad, a suspension, an arm, an actuator, and a control section. The control section has a lubricant uniforming function of increasing a speed with which the magnetic head is moved toward an outer periphery of the magnetic disk to be higher than a speed with which the magnetic head is moved toward an inner periphery of the magnetic disk.

16 Claims, 7 Drawing Sheets

CONTACT MAGNETIC DISK APPARATUS

BACKGROUND OF THE INVENTION

1. Field of the Invention

The present invention relates to a contact magnetic disk apparatus and, more particularly, to a contact magnetic disk apparatus for recording/reproducing information by bringing the contact pads of a magnetic head into contact with a magnetic disk surface coated with a lubricant.

2. Description of the Prior Art

Figure 1A:
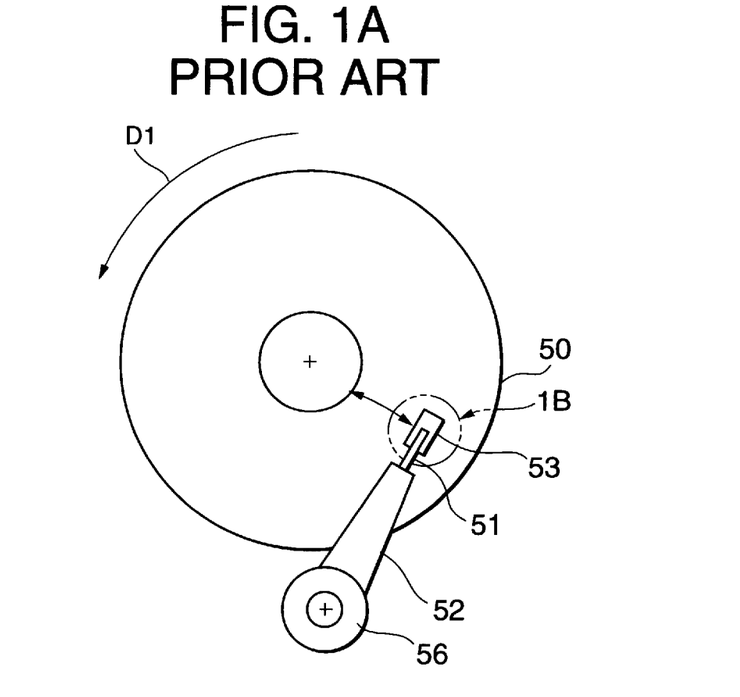
Figure 1B:
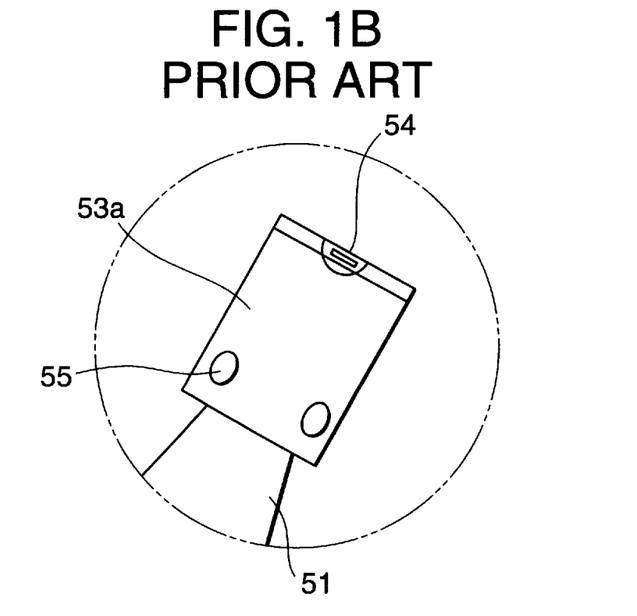
FIG. 1B is an enlarged view of the slider surface of a magnetic head indicated as a portion 1B in FIG. 1A.
Figure 2:
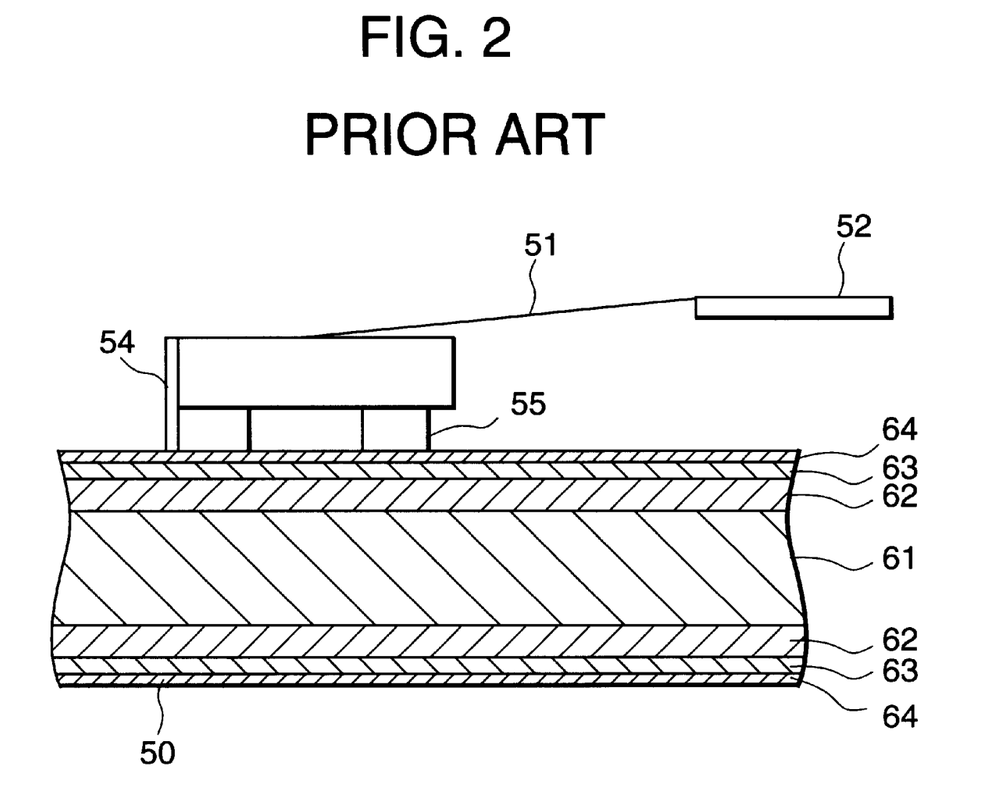
FIG. 2 is a sectional view showing the layer structure of a conventional magnetic disk.

FIGS. 1A and 1B, and 2 show a conventional example. Referring to FIGS. 1A and 1B, a magnetic head 53 is held on the surface of a magnetic disk 50, rotated in the direction of an arrow D1, through a suspension 51 and an arm 52. A recording/reproducing element 54 and contact pads 55 are fixed to the magnetic head 53. The contact pads 55 are urged against the magnetic disk surface by the suspension 51. Along with the operation of an actuator 56, the magnetic head 53 is moved in substantially the radial direction of the magnetic disk 50. The section of each contact pad 55 which is parallel to a slider surface 53a of the magnetic head 53 is formed into an elliptic shape having a minor axis in the radial direction of the magnetic disk 50. The two contact pads 55 are arranged in the radial direction of the magnetic disk 50. In the magnetic disk 50, a substrate 61 at the center is sandwiched by magnetic films 62, protection films 63, and lubricant films 64 in the order named, as shown in FIG. 2. Hence, the contact pads 55 of the magnetic disk 50 are kept in contact with the lubricant film 64 of the magnetic disk 50. Wear of the magnetic disk surface is prevented while realizing a high recording density.

In general, the substrate 61 is made of glass or an aluminum alloy coated with a nickel-phosphorus plating film. The magnetic films 62 are made of a cobalt alloy, e.g., CoPtCr or CoCtTa. The protection films 63 are made of carbon. The lubricant films 64 contain perfluoropolyether and the like.

In the above conventional example, rotation of the magnetic disk generates a centrifugal force to move and scatter the lubricant, leading to a decrease or nonuniformity in thickness of the lubricant films. In this case, the lubricant may become insufficient and the contact portions may accordingly be worn, leading to a recording/reproducing error or erroneous erasure of the recorded information.

The present invention is made on the basis of the following situation. Namely, the present inventors experimentally found that a constant relationship was present between the operation of a contact magnetic head driven by an actuator and the thickness decreasing tendency of the lubricant.

SUMMARY OF THE INVENTION

The present invention has been made in order to solve the inconveniences of the prior art, and has as its object to provide a contact magnetic disk apparatus in which a decrease in thickness of a lubricant applied to the outermost surface of a magnetic disk medium is prevented, so that wear of a contact magnetic head and a magnetic disk medium can be effectively suppressed.

In order to achieve the above object, according to the major aspect of the present invention, there is provided a contact magnetic disk apparatus comprising a magnetic disk having a surface coated with a lubricant, a magnetic head for recording and reproducing information on and from the magnetic disk, a contact pad fixed to a slider surface of the magnetic disk, a suspension for urging the contact pad against the surface of the magnetic disk through the lubricant, an arm connected to the suspension, an actuator for operating the arm to move the magnetic head in a substantially radial direction of the magnetic disk, and a control section for controlling an operation of the actuator, wherein the control section has a lubricant uniforming function of increasing a speed with which the magnetic head is moved toward an outer periphery of the magnetic disk to be higher than a speed with which the magnetic head is moved toward an inner periphery of the magnetic disk.

With the arrangement described in the major aspect, when the magnetic head is moved toward the inner periphery, the lubricant is effectively guided toward the inner periphery. When the magnetic head is moved toward the outer periphery, it does not comparatively influence movement of the lubricant in the centrifugal direction (in the outer peripheral direction of the magnetic disk).

In connection with the above major aspect, the present invention has auxiliary aspects as follows.

According to the first auxiliary aspect, the lubricant uniforming function described in the major aspect moves the magnetic head toward the inner periphery of the magnetic disk at a speed not higher than $V0=R \times n$ where R is a radius of the contact pad and n is a rotation speed of the magnetic disk and toward the outer periphery of the magnetic disk at a speed higher than V0.

According to the second auxiliary aspect, the contact pad described in the above major aspect has a section parallel to the slider surface of the magnetic head, which is formed into a circle.

According to the third auxiliary aspect, the contact pad described in the above major aspect has a section parallel to the slider surface of the magnetic head, which is formed into a C shape open toward the inner periphery of the magnetic disk.

According to the fourth auxiliary aspect, the contact pad described in the above major aspect has a section parallel to the slider surface of the magnetic head, which is formed into a semicircle having an arc toward the inner periphery of the magnetic disk.

According to the fifth auxiliary aspect, the surface of the magnetic disk described in the above major aspect has an average square roughness of 0.1 nm to 0.5 nm.

According to the sixth auxiliary aspect, the magnetic pad described in the above major aspect is urged against the surface of the magnetic disk with a load of not more than 0.5 gf.

According to the first to sixth auxiliary aspects described above, it is experimentally confirmed that movement of the lubricant in the centrifugal direction is suppressed comparatively effectively even when the magnetic head is moved toward the outer periphery of the magnetic disk.

The present invention has the arrangement and function as described above. Therefore, the present invention can provide an excellent magnetic disk apparatus that is not conventionally available, in which a decrease in thickness of the lubricant applied to the surface of the magnetic disk can be effectively suppressed by optimizing the shape of the contact pad provided to the magnetic head, the seek moving speed of the magnetic head, the urging load of the magnetic head, and the surface roughness of the magnetic disk, and the mechanical reliability of the apparatus can be improved through wear prevention of the magnetic disk and magnetic head.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIGS. 1A and 1B show the schematic arrangement of the main part of the prior art, in which

FIGS. 3A and 3B show the schematic arrangement of the main part of an embodiment of the present invention, in which

DETAILED DESCRIPTION OF THE PREFERRED EMBODIMENTS

Several preferred embodiments of the present invention will be described with reference to the accompanying drawings. The same constituent portions as in the prior art are denoted by the same reference numerals in order to avoid a repetitive explanation.

Figure 3A:
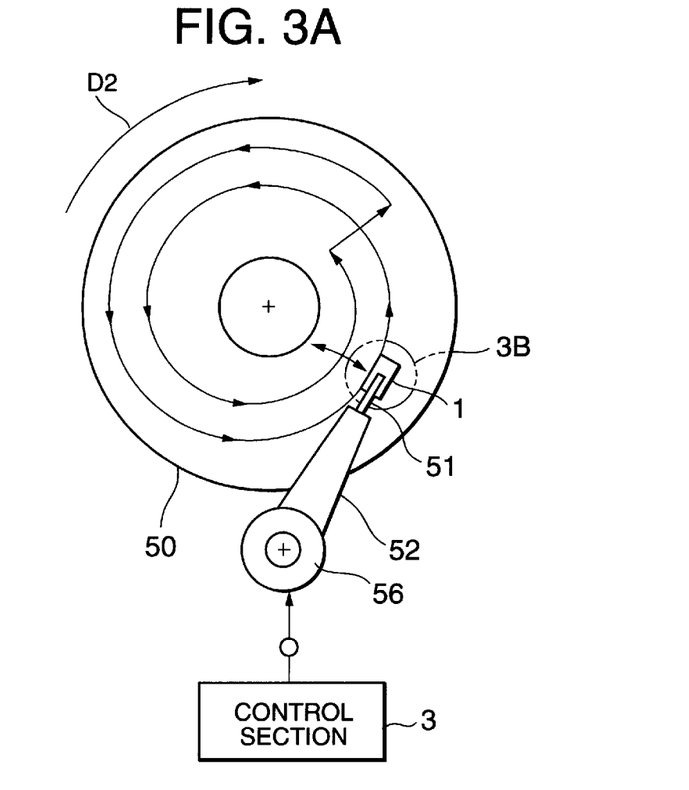
Figure 3B:
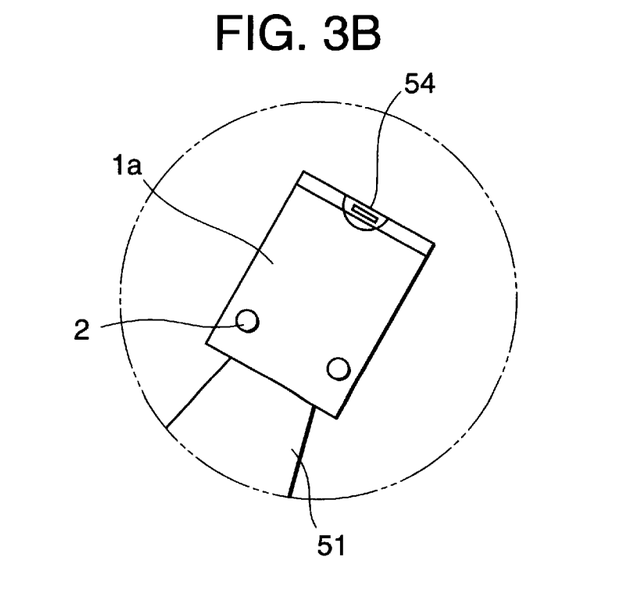
FIG. 3B is an enlarged view of the slider surface of a magnetic head indicated as a portion 3B in FIG. 3A.

In the embodiment shown in FIGS. 3A and 3B, a control section 3 connected to an actuator 56 has a lubricant uniforming function of increasing the speed with which a magnetic head 1 is moved toward the outer periphery of a magnetic disk 50 rotated in the direction of an arrow D2, to be higher than the speed with which the magnetic head 1 is moved toward the inner periphery of the magnetic disk 50. Therefore, when the magnetic head 1 is moved toward the inner periphery, its trace moves on the magnetic disk 50 relative to it to draw a large spiral, as shown in FIG. 3A. At this time, contact pads 2 guide a lubricant applied to the surface of the magnetic disk 50 toward the inner periphery against the centrifugal force. In this embodiment, the section of each contact pad 2 which is parallel to a slider surface is formed into a circle.

Assuming that the diameter of each circular contact pad 2 is defined as D, the radial position where the contact pads 2 slidably move on the magnetic disk 50 is defined as r, and the rotation speed of the magnetic disk 50 is defined as n, when the contact pads 2 are rotated on the magnetic disk 50 by one turn, it can sweep the lubricant toward the inner periphery most efficiently when they move toward the inner periphery by a distance corresponding to their radius R (=D/2). Accordingly, the control section 3 is preset to drive the actuator 56 in that manner.

When the magnetic head 1 is moved toward the outer periphery, the control section 3 performs a control operation so that the magnetic head 1 is moved comparatively linearly relative to the magnetic disk 50. This effectively prevents the lubricant applied to the magnetic disk 50 from being inconveniently guided by the movement of the magnetic head 1 in the centrifugal direction.

More specifically, the lubricant uniforming function desirably moves the magnetic head 1 toward the inner periphery at a speed equal to or lower than V0=R×n where R is the radius of the contact pads 2 and n is the rotation speed of the magnetic disk 50 and toward the outer periphery at a speed higher than V0. If the moving speed toward the inner periphery is higher than V0, some portions on the magnetic disk surface are left not in contact with the contact pads 2, and the lubricant sweeping effect decreases rapidly. When the magnetic head 1 is moved toward the inner periphery, a lubricant film 64 is swept toward the inner periphery, and accordingly the lubricant is not swept toward the outer periphery by the movement of the contact pad corresponding to the remaining radius R portion. When moving the magnetic head 1 from the inner periphery toward the outer periphery, the more rapidly it is moved, the smaller the effect of sweeping the lubricant toward the outer periphery, which is preferable.

When the urging force of the contact pads and the counter-compression force of the lubricant are in equilibrium, assume that the thickness of lubricant which is removed by one sliding operation in accordance with the urging load is defined as δ, that the radial position on the disk of the center of the contact pad at the outermost position of the magnetic disk is defined as r0, and that the radial position on the disk of the center of the contact pad at the innermost position of the magnetic disk is defined as ri. The amount of lubricant which is swept toward the inner periphery at the optimum moving speed V0 is $\delta\pi(r0-ri)^2$. The amount of lubricant swept from the inner periphery toward the outer periphery can be approximated as δD (r0–ri), provided that a moving speed V2 of the magnetic head toward the outer periphery is equal to or higher than the speed V1=2πnr (r is the radius of an arbitrary magnetic disk on which a contact pad is present) in the rotating direction of the magnetic disk. Therefore, the amount of lubricant which is swept toward the inner periphery is $\delta(\pi(r0-ri)^2-D(r0-ri))$ per reciprocal movement of the magnetic head. When this amount is appropriately set, the lubricant which flows toward the outer periphery of the magnetic disk due to the centrifugal force can be returned toward the inner periphery, and the thickness of the lubricant can be maintained at a constant value.

Figure 4:
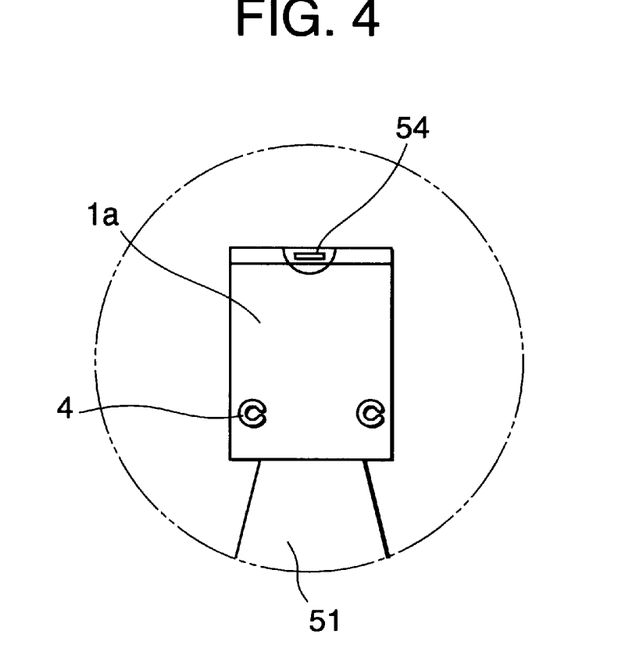
FIGS. 4 and 5 are enlarged views of the slider surfaces of magnetic heads of two other embodiments, respectively, of the present invention.
Figure 5:
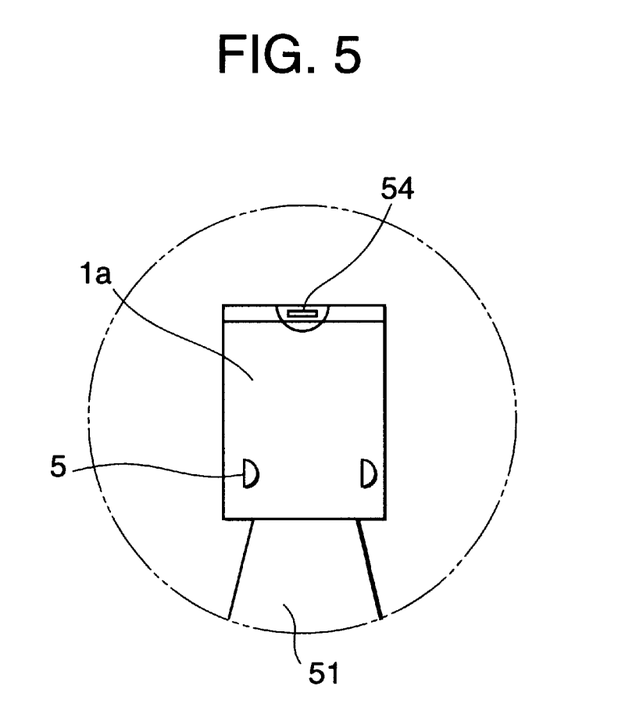

As described above, in the contact pad 2 according to this embodiment, its section parallel to the slider surface is a circle. However, the contact pad 2 is not limited to this, and a contact pad 2, the section of which parallel to a slider surface 1a has a C shape open toward the inner periphery of the disk, may be used. Alternatively, a contact pad 2, the section of which parallel to a slider surface 1a is formed into a semicircular shape having an arc toward the inner periphery of the disk, may be used.

The average square roughness of the surface of the magnetic disk preferably falls within the range of 0.1 nm to 5.0 nm. The urging load of the contact pad against the magnetic disk surface is preferably equal to or less than 0.5 gf. These values are specified experimentally.

Experimental examples performed in connection with the above embodiments will be described with reference to FIGS. 6 to 9.

EXPERIMENTAL EXAMPLE 1

Figure 6:
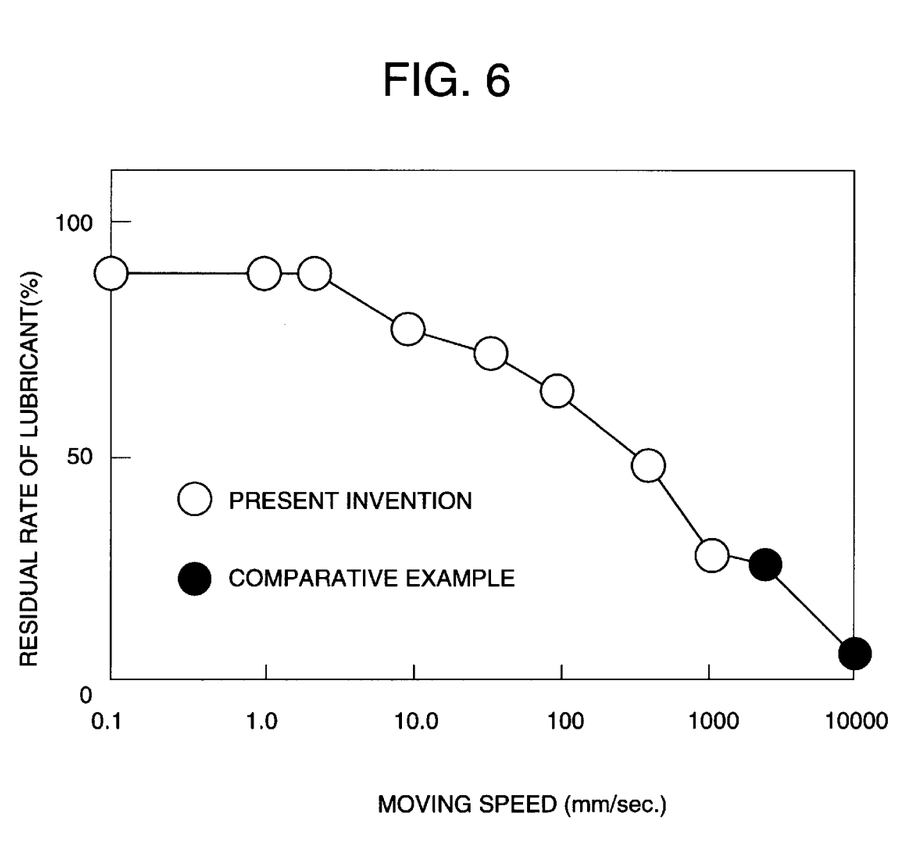
FIG. 6 is a graph showing the relationship between the moving speed and the residual rate of the lubricant obtained when the magnetic head performs a seek operation toward the inner periphery of the magnetic disk.

Using a 2.5-inch magnetic disk 50, the magnetic head 1 was moved between a 11-mm position and a 32-mm position in the radial direction. The magnetic head 1 had a recording/reproducing element 54 and two contact pads 2 each with a diameter D=0.03 mm, and its entire mass was 1.6 mg. The magnetic head 1 was brought into contact with the magnetic disk 50 with a load of 0.1 gf. The magnetic disk 50 was rotated at a rotation speed of 120 revolutions per second. In this state, the magnetic head 1 was moved at a constant speed from the outer periphery toward the inner periphery of the magnetic disk 50, and was successively moved at a speed of 2,700 mm per second from the inner periphery toward the inner periphery. The speed with which the magnetic head 1 was moved toward the inner periphery was selected from a range of 0.1 to 3,000 mm/s, and a plurality of tests were performed. The surface roughness of the magnetic disk 50 was set to 0.7 nm (Ra). The thickness of a lubricant film 64 was set to 5 nm. The thickness of the lubricant film 64 was measured after a 100-hour test. A value obtained by dividing the thickness by the initial thickness was defined as the residual rate (%). FIG. 6 shows the results.

In FIG. 6, the results of Experimental Example 1 indicated by hollow circles are obtained when the speed with which the magnetic head 1 is moved from the inner periphery toward the outer periphery is higher than the speed with which the magnetic head 1 is moved from the outer periphery toward the inner periphery. The results of comparative examples indicated by solid circles are obtained when the speed with which the magnetic head 1 is moved from the inner periphery toward the outer periphery is equal to or lower than the speed with which the magnetic head 1 is moved from the outer periphery toward the inner periphery. From FIG. 6, it was confirmed that an apparent suppression effect against a decrease in thickness of the lubricant was obtained with Experimental Example 1 when compared to the comparative examples. In FIG. 6, since the radius R of the contact pads 2 is 0.015 mm and the rotation speed n of the magnetic disk is 120 revolutions per second, the optimum speed V0=R×n is calculated to be 1.8 mm/s. In fact, the effect of suppressing a decrease in thickness of the lubricant is the maximum with a speed equal to or lower than this value.

EXPERIMENTAL EXAMPLE 2

Figure 7:
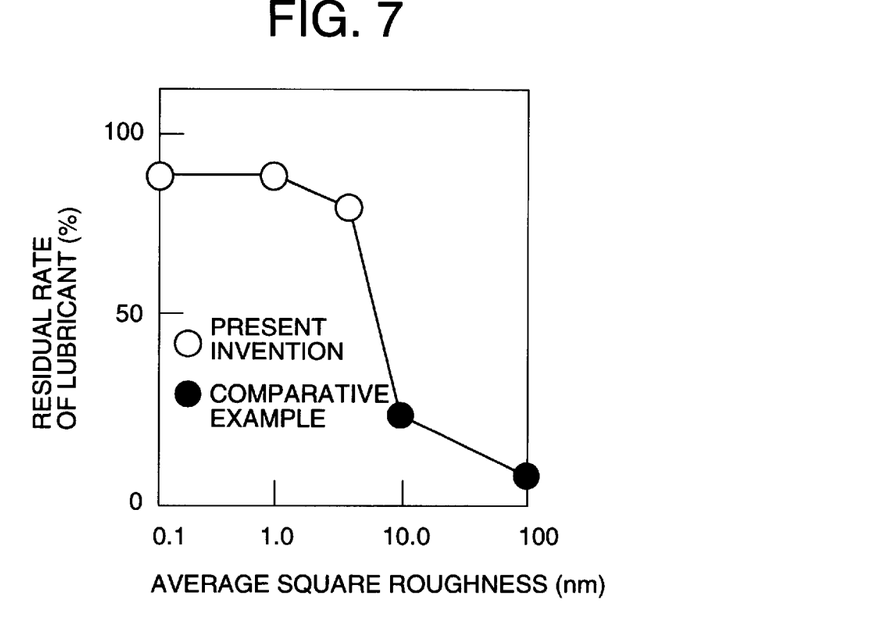
FIG. 7 is a graph showing the relationship between the average square roughness of the magnetic disk and the residual rate of the lubricant.

In the embodiments of FIGS. 3A and 3B, the residual rate of the thickness of the lubricant film 64 was examined while changing the average square roughness (Ra) of the magnetic disk 50 within a range of 0.1 nm to 100 nm. The initial thickness of the lubricant film 64 was set to 5 nm. FIG. 7 shows the residual rate (%) of the thickness of the lubricant obtained after a 100-hour test. According to the results of FIG. 7, the residual rate of the thickness is large when the average square roughness is equal to or less than the initial thickness (5.0 nm) of the lubricant. When the average square roughness exceeds the thickness of the lubricant, the residual rate of the thickness becomes worse, because the lubricant left in the bottom portions of the roughness of the surface of the magnetic disk cannot be pushed out with the contact pads.

EXPERIMENTAL EXAMPLE 3

Figure 8:
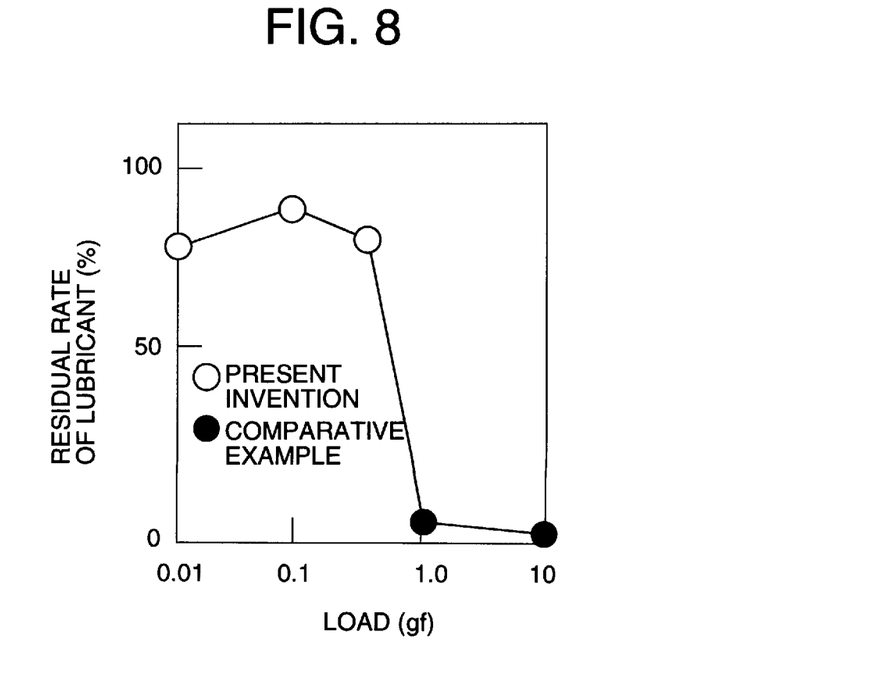
FIG. 8 is a graph showing the relationship between the urging load of the magnetic head against the magnetic disk and the residual rate of the lubricant.

In the embodiment of FIGS. 3A and 3B, the relationship between the residual rate of the thickness of the lubricant and the urging load of the magnetic head 1 was examined while changing the urging load within a range of 0.01 gf and 10 gf. FIG. 8 shows the results of the residual rate (%) of the thickness of the lubricant after a 100-hour test. According to FIG. 8, in Experimental Example 3 (indicated by hollow circles) performed with the load equal to or smaller than 0.5 gf, the residual rate of the thickness is larger than in comparative examples (indicated by solid circles), because if the load is large, the lubricant is pushed out excessively to decrease the residual rate. If the load is smaller than 0.1 gf, the lubricant pushout pressure is decreased, and the residual rate of the lubricant is degraded slightly.

Figure 9:
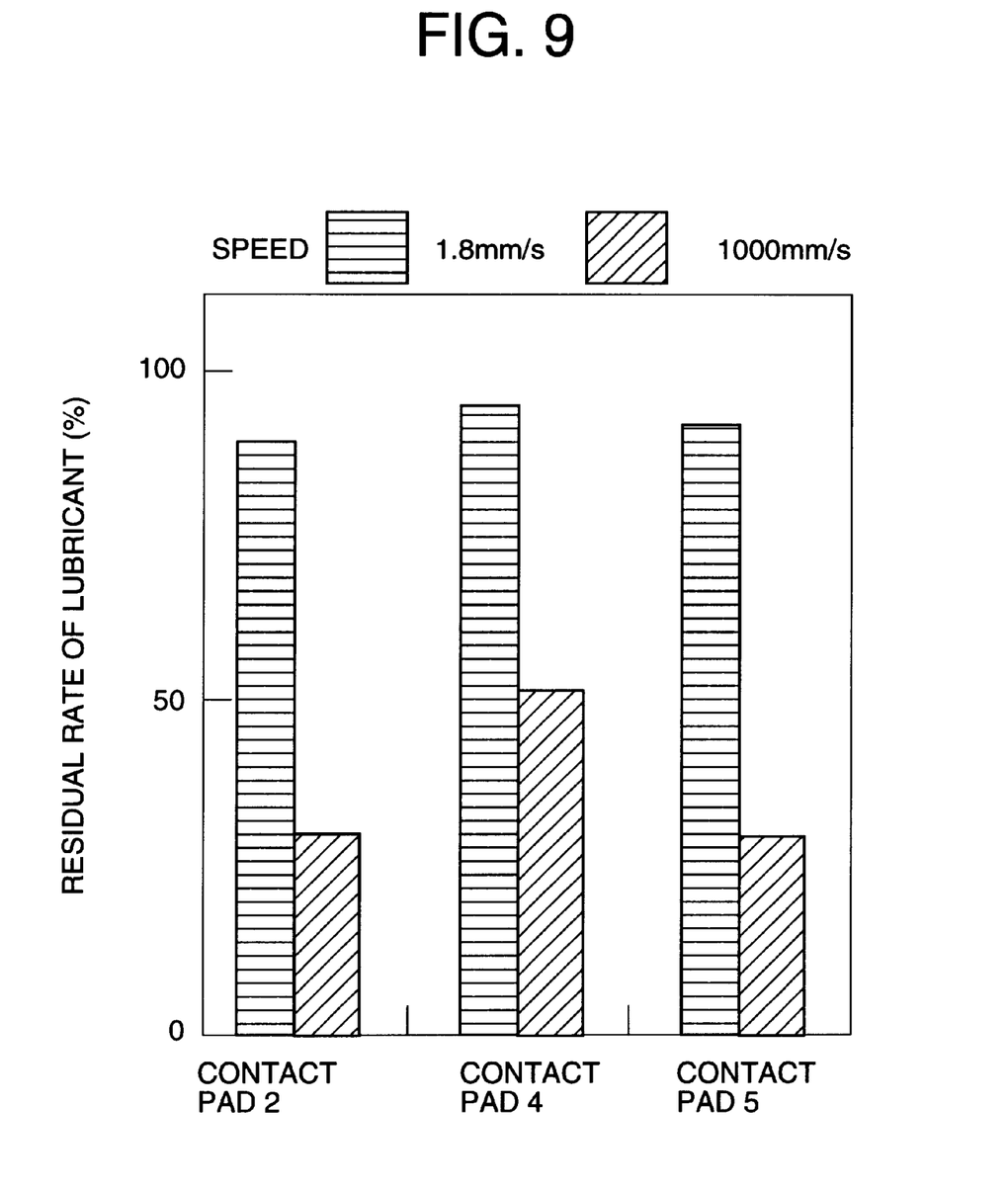
FIG. 9 is a graph showing the relationship between the shape of the contact pad and the residual rate of the lubricant of each of the embodiments shown in FIGS. 3B, 4, and 5.

The relationship between the residual rate of the lubricant and the moving speed was examined for each of the contact pads 2, 4, and 5 of FIGS. 3B, 4, and 5, respectively. Each magnetic head 1 had a mass of 1.6 mg, and was urged against the magnetic disk with a load of 0.1 gf. In this state, a seek operation was performed with the moving speed of 1.8 mm/s toward the inner periphery and 2,700 mm/s toward the outer periphery. Also, a seek operation was performed with the moving speed of 1,000 mm/s toward the inner periphery and 2,700 mm/s toward the outer periphery. After a test was continued under each condition for 100 hours, the residual rate (%) of the thickness of the lubricant was examined. FIG. 9 shows the results. According to FIG. 9, when the contact pads 4 shown in FIG. 4 were used, the residual rate of the thickness of the lubricant was higher than the case using the contact pads 2 of FIG. 3B. In particular, this increase was apparent within a high-speed range (1,000 mm/s). When the contact pads 5 of FIG. 5 were used, the residual rate of the thickness of the lubricant was higher than the case using the contact pads 2 of FIG. 3B.

In this manner, in the respective experimental examples, an apparent effect of suppressing a decrease in thickness of the lubricant was observed as compared to the comparative examples. More specifically, when the speed with which the magnetic head 1 is moved toward the outer periphery of the magnetic disk is set to be higher than the speed with which it is moved toward the inner periphery, in particular, when the magnetic head 1 is moved toward the inner periphery at a speed equal to or lower than the optimum speed expressed as V0=R×n (R: the radius of the contact pads; and n: rotation speed of the magnetic disk) and moved toward the outer periphery at a speed higher than V0, the effect of suppressing a decrease in thickness becomes large. It has become obvious that this suppressing effect was higher with the semicircular contact pads 5 than with the circular contact pads 2, and was higher with the C-shaped contact pads 4 than with the semicircular contact pads 5. Furthermore, it has become also obvious that the effect of suppressing the decrease in thickness became apparent when the magnetic disk had a smooth surface with an average square roughness of 0.1 nm to 5.0 nm and when the urging load of the magnetic head 1 against the magnetic disk surface was set to be equal to or smaller than 0.5 gf.

What is claimed is:

1. A contact magnetic disk apparatus for recording and reproducing information to and from magnetic disk having a surface coated with a lubricant, said apparatus comprising:
   a magnetic head;
   a contact pad fixed to a slider surface of said magnetic head;
   a suspension connected to said magnetic head for urging said magnetic head including said contact pad against said surface of said magnetic disk through said lubricant;
   an arm connected to said suspension;
   an actuator for operating said arm to move said magnetic head in a substantially radial direction of said magnetic disk; and a control section for controlling an operation of said actuator, said control section comprising a lubricant uniforming function for causing said magnetic head to move toward an outer periphery of said magnetic disk at a first speed and causing said magnetic head to move toward an inner periphery of said magnetic disk at a second speed which is lower than said first speed.

2. The apparatus according to claim 1, wherein said first speed is higher than V0 and said second speed is equal to or lower than V0, where V0=R×n, and where R is a radius of said contact pad and n is a rotation speed of said magnetic disk.

3. The apparatus according to claim 1, wherein said contact pad has a surface parallel to said slider surface of said magnetic head, which is in a shape of a circle.

4. The apparatus according to claim 1, wherein said contact pad has a surface parallel to said slider surface of said magnetic head, which is in a shape of a C having an opening toward said inner periphery of said magnetic disk.

5. The apparatus according to claim 1, wherein said contact pad has a surface parallel to said slider surface of said magnetic head, which is in a shape of a semicircle having an arc toward said inner periphery of said magnetic disk.

6. The apparatus according to claim 1, wherein said surface of said magnetic disk has an average square roughness of 0.1 nm to 0.5 nm.

7. The apparatus according to claim 1, wherein said magnetic head including said contact pad is urged against said surface of said magnetic disk with a load of not more than 0.5 gf.

8. The apparatus according to claim 1, wherein a thickness of said lubricant is maintained substantially uniform during operation of the apparatus.

9. The apparatus according to claim 1, wherein said contact pad maintains a uniform thickness of said lubricant during read/write operations.

10. The apparatus according to claim 1, wherein said apparatus maintains a thickness of said lubricant by varying one of a speed of a magnetic head, a shape of said contact pad, a roughness of said magnetic disk, and a load with which said magnetic head including said contact pad is urged against said magnetic disk.

11. The apparatus according to claim 1, wherein a force applied inwardly by a contact pad on said lubricant counteracts a centrifugal force applied outwardly on said lubricant so that said force and said centrifugal force are in equilibrium.

12. The apparatus according to claim 1, wherein said contact pad applies substantially no force outwardly on said lubricant.

13. The apparatus according to claim 1, wherein as said magnetic head moves outwardly more rapidly, a lesser force is applied outwardly by said contact pad on said lubricant.

14. The apparatus according to claim 2, wherein an amount of lubricant which is swept toward an inner periphery of said disk when said magnetic head is moving at speed V0 is defined by $\delta\pi(r0-ri)^2$ where $\delta$ is a thickness of lubricant removed by one sliding operation, r0 is a radial position of said contact pad's outermost position on said disk, and ri is a radial position of said contact pad's innermost position on said disk.

15. The apparatus according to claim 2, wherein an amount of lubricant which is swept toward an outer periphery of said disk when said magnetic head is moving at speed V0 is defined by $\delta D(r0-ri)$ where $\delta$ is a thickness of lubricant removed by one sliding operation, D is a diameter of said contact pad, r0 is a radial position of said contact pad's outermost position on said disk, and ri is a radial position of said contact pad's innermost position on said disk.

16. The apparatus according to claim 2, wherein said contact pads have a radius of 0.015 mm and said magnetic disk is rotated at 120 revolutions per second and said speed V0 is 1.8 mm/s.

* * * * *